(12) United States Patent
Kim et al.

(10) Patent No.: US 9,212,739 B2
(45) Date of Patent: Dec. 15, 2015

(54) ORGAN TYPE ELECTRONIC AUTOMATIC SHIFT LEVER

(71) Applicant: Hyundai Motor Company, Seoul (KR)

(72) Inventors: Eun-Sik Kim, Kwangmyong-shi (KR); Jeong-Seop Lee, Yongin-shi (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/504,267

(22) Filed: Oct. 1, 2014

(65) Prior Publication Data

US 2015/0135877 A1    May 21, 2015

(30) Foreign Application Priority Data

Nov. 15, 2013 (KR) .................. 10-2013-0139181

(51) Int. Cl.
  *F16H 59/02* (2006.01)
  *F16H 59/08* (2006.01)
  *F16H 59/10* (2006.01)
  *G05G 1/00* (2008.04)

(52) U.S. Cl.
  CPC ............ *F16H 59/08* (2013.01); *F16H 59/0278* (2013.01); *F16H 59/105* (2013.01); *F16H 2059/026* (2013.01); *G05G 1/00* (2013.01)

(58) Field of Classification Search
  None
  See application file for complete search history.

(56) References Cited

U.S. PATENT DOCUMENTS

| 5,910,067 A * | 6/1999 | Vandendriessche et al. ... 477/92 |
| 7,971,498 B2 * | 7/2011 | Meyer et al. .................. 74/10.41 |
| 2004/0162661 A1 * | 8/2004 | Kikuchi ......................... 701/62 |

FOREIGN PATENT DOCUMENTS

| KR | 10-2011-0092388 A | 8/2011 |
| KR | 10-2013-0026816 A | 3/2013 |

* cited by examiner

*Primary Examiner* — Edwin A Young
(74) *Attorney, Agent, or Firm* — Morgan, Lewis & Bockius LLP

(57) ABSTRACT

An organ type electronic automatic shift lever may include a shift lever portion, a step motor unit, an operating arm, a position recognition unit, and a gear shift stage control unit. The shift lever portion may have a lower end at which a magnetic unit is mounted. The step motor unit may be fixed on a console surface of a vehicle and include a step motor. The operating arm may be rotatably connected to the shift lever portion and the step motor. The position recognition unit may recognize a position of the magnetic unit and output information of the recognized position. The gear shift stage control unit may control the step motor unit, preset position recognition information, compare position information and output gear shift information.

11 Claims, 13 Drawing Sheets

100

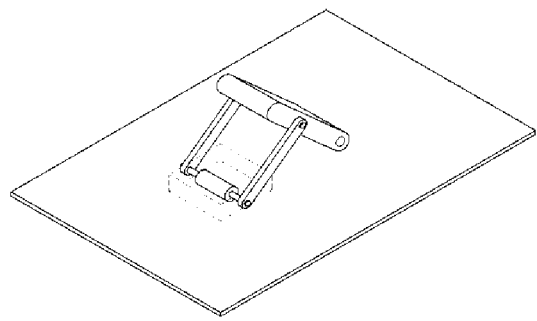
FIG. 7A
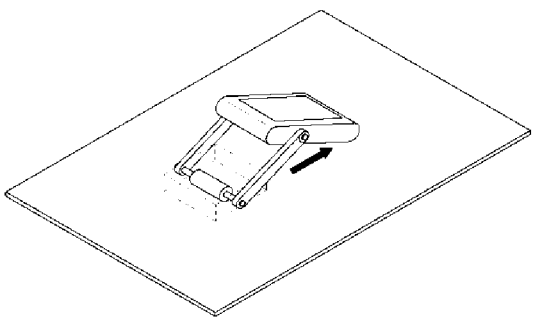
FIG. 7D
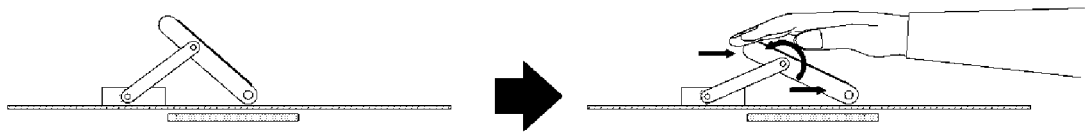
FIG. 7B
FIG. 7E
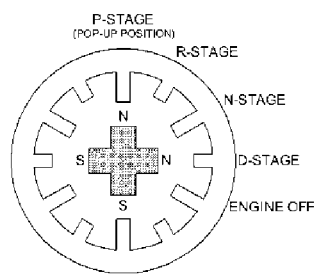
FIG. 7C
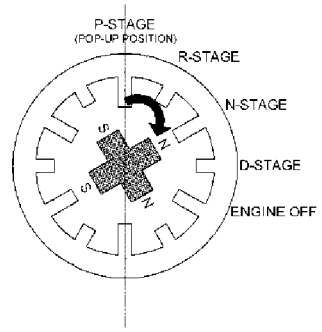
FIG. 7F

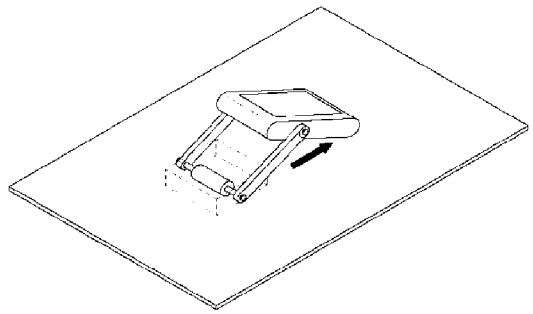
FIG. 8A
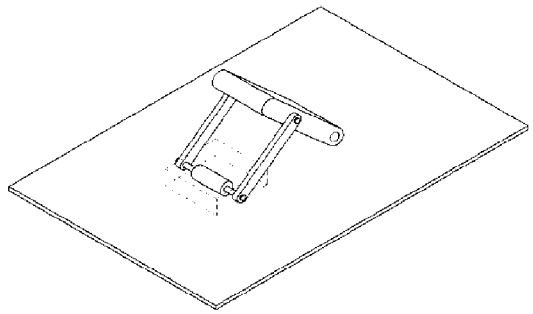
FIG. 8D
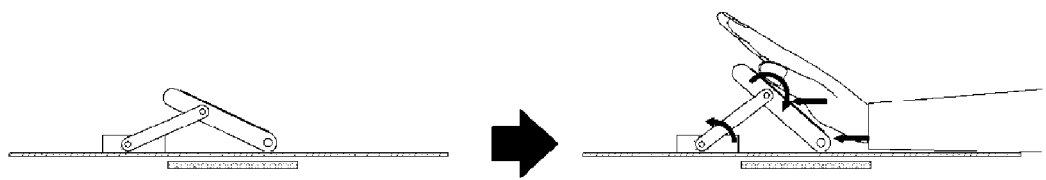
FIG. 8B
FIG. 8E
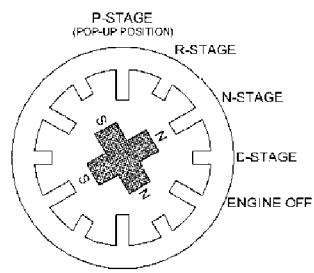
FIG. 8C
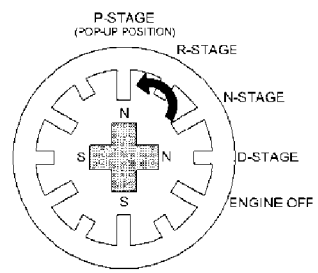
FIG. 8F

ORGAN TYPE ELECTRONIC AUTOMATIC SHIFT LEVER

CROSS-REFERENCE TO RELATED APPLICATIONS

The present application claims priority of Korean Patent Application Number 10-2013-139181 filed on Nov. 15, 2013, the entire contents of which application is incorporated herein for all purposes by this reference.

BACKGROUND OF INVENTION

1. Field of Invention

The present invention relates to an electronic automatic shift lever, and more particularly, to an organ type electronic automatic shift lever which is an electronic automatic shift lever provided in an automatic gear shift vehicle, has a shift lever portion of the automatic shift lever that is movable forward and rearward, and forms a coupling portion using a rotation shaft, such that an angle of the shift lever portion is varied by a manipulation of the shift lever portion, and a preset gear shift manipulation is performed depending on the angle of the shift lever which is varied by the manipulation of the shift lever portion.

2. Description of Related Art

In general, as a shift lever which is provided in a vehicle in order to control gear shift stages of the vehicle, there are a mechanical shift lever and an electronic shift lever, and recently, usage of the electronic shift lever has increased.

The electronic shift lever amongst others is generally disposed in a console in a driver seat in the vehicle, and the lever protrudes from an upper portion of the console so that a user may easily manipulate the lever. This configuration provides operational feeling that is similar to that of the mechanical shift lever in the related art so as to allow the user to easily control the gear shift stages.

FIG. 1 illustrates an example of an electronic shift lever in the related art, and FIG. 2 simply illustrates an arm structure of a user who manipulates the electronic shift lever in the related art.

As illustrated, the electronic shift lever in the related art is guided so that the shift lever is mainly manipulated forward and rearward when manipulating the gear shift stages.

However, the aforementioned electronic shift lever in the related art has the following drawbacks.

An external appearance and a manipulation manner of the electronic shift lever are identical to those of the mechanical shift lever in the related art, that is, the electronic shift lever is identical to the mechanical shift lever in terms of the manipulation manner in which a fixed lever is manipulated forward and rearward, and thus there is no advantage even though the electronic shift lever is adopted instead of the mechanical shift lever in the related art.

The electronic shift lever is fixed in a state in which the electronic shift lever protrudes in the driver seat, and thus a probability that the driver's body collides with the electronic shift lever at the time of a vehicle collision is increased, and as a result, it is disadvantageous to ensure safety of the driver at the time of a collision.

A space occupied by the electronic shift lever is large, that is, a predetermined space needs to be allocated to receive gear shift patterns because the shift lever needs to be moved along the gear shift patterns, and as a result, an internal space of the vehicle, for example, a space for accommodating a cup holder, is small, and a space for performing functions of necessary buttons is insufficient.

As illustrated in FIG. 2, when manipulating the shift lever, the driver needs to further extend the arm to reach a gear shift stage that is allocated at a position farther from the driver when gear shifting is performed, and the arm is directed downward to reach a gear shift stage that is allocated at a position closer to the driver, but because all manipulation heights of the gear shift stages are similar to each other in the electronic shift lever in the related art, it may be inconvenient for the driver when manipulating the shift lever.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide an organ type electronic automatic shift lever which is an electronic automatic shift lever provided in an automatic gear shift vehicle, has a shift lever portion of the automatic shift lever that is movable forward and rearward, and forms a coupling portion using a rotation shaft, such that an angle of the shift lever portion is varied by a manipulation of the shift lever portion, and a preset gear shift manipulation is performed depending on the angle of the shift lever which is varied by the manipulation of the shift lever portion.

Various aspects of the present invention provide an organ type electronic automatic shift lever including: a shift lever portion which has a lower end at which a magnetic unit including a magnet is mounted; a step motor unit which is fixed on a console surface of a vehicle, and includes a step motor; an operating arm which has one end that is rotatably connected to an upper end of the shift lever portion by a rotation shaft, and the other end that is connected to a motor rotation shaft of the step motor, and rotatably fixes the shift lever portion on the console surface; a position recognition unit which includes one or more magnetic sensors so as to recognize a position of the magnetic unit, and output information about the recognized position; and a gear shift stage control unit which controls rotation of the step motor unit, presets position recognition information produced by matching in advance gear shift stage information of the electronic automatic shift lever to each position of the position recognition unit, compares position information, which is recognized and received from the position recognition unit, with the position recognition information, and outputs gear shift information.

The shift lever portion may further include a display unit, and the display unit may receive the gear shift information from the gear shift stage control unit and display the gear shift information.

The organ type electronic automatic shift lever may further include a magnetic material which is mounted in the console surface of the vehicle within a movement range of the magnetic unit, in which a lower portion of the shift lever portion comes into close contact with the console surface by magnetic force.

The gear shift stage information may include information about a P-stage, an N-stage, a D-stage, and an engine off-stage, and the gear shift stage control unit may preset the position recognition information in the position recognition unit by sequentially matching the P-stage, the N-stage, the D-stage, and the engine off-stage from a position which is the closest to the step motor to a position which is the farthest from the step motor.

The gear shift stage control unit may rotate the step motor unit so as to control the shift lever portion so that the shift lever portion is popped up when the engine of the vehicle is turned on. The gear shift stage control unit may operate the step motor unit so as to control the shift lever portion so that the shift lever portion is popped down when the engine of the vehicle is turned off.

Intervals between cores of a stator coil of the step motor of the step motor unit may be equal to intervals between gear shift stages allocated to the position recognition unit. Cores of a stator coil of the step motor of the step motor unit may be formed to have different lengths.

The gear shift stage control unit may receive brake pedal input of the vehicle, and increase an electric current being applied to the step motor unit when the brake pedal input is not present at the time of an initial operation, and the gear shift stage control unit may control the step motor unit so that the step motor returns back to a state at the time of the initial operation when the shift lever portion is moved in a state in which brake pedal input is not present at the time of the initial operation.

When the engine off-stage is recognized, the gear shift stage control unit may turn off the engine of the vehicle, and turn off the engine after waiting for a predetermined standby time.

The present invention enables a gear shift manipulation using a simple structure in comparison with a structure of an electronic shift lever in the related art, thereby providing an effect capable of improving performance for reducing costs when the electronic automatic shift lever is manufactured. Particularly, the step motor has cogging torque, and the cogging torque is utilized to provide feeling of moderation when gear shifting is performed, thereby greatly improving performance for reducing costs by eliminating a separate device for providing feeling of moderation.

A movement trajectory of the shift lever portion when a gear shift manipulation is performed is formed to be similar to a manipulation trajectory of the arm of the driver, thereby improving operational feeling.

The engine off-stage is formed, and the engine off-stage is allocated to a state in which the shift lever portion is popped down, such that it is possible to turn off the engine by pressing the shift lever portion by the driver at the time of turning off the engine OFF, thereby improving convenience.

The shift lever portion has no protruding portion, and thus damage to the driver's body and the shift lever portion may be prevented at the time of a vehicle collision. The engine is turned off when the shift lever portion is popped down due to a collision, thereby preventing a secondary accident and improving safety.

The shift lever portion is configured to be popped up at the time of starting the engine of the vehicle, thereby improving marketability.

The display unit is attached to the upper portion of the shift lever portion, and gear shift stage information and a warning message are provided through the display unit, thereby improving convenience for the driver.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 7A, FIG. 7B, FIG. 7C, FIG. 7D, FIG. 7E and FIG. 7F illustrate a process of manipulating a shift lever portion, which is in a pop-up state, of an exemplary organ type electronic automatic shift lever to any stage (e.g., N-stage) according to the present invention.

FIG. 8A, FIG. 8B, FIG. 8C, FIG. 8D, FIG. 8E and FIG. 8F illustrate a process of manipulating a shift lever portion, which is positioned at any gear shift stage position (e.g., N-stage), of an exemplary organ type electronic automatic shift lever to the P-stage according to the present invention.

FIG. 13A, FIG. 13B, FIG. 13C, FIG. 13D, FIG. 13E and FIG. 13F illustrate an engine off control manipulation state using an exemplary organ type electronic automatic shift lever according to the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

The present invention relates to an electronic automatic shift lever, and more particularly, in an electronic automatic shift lever provided in an automatic gear shift vehicle, the electronic automatic shift lever has a shift lever portion of the automatic shift lever that is movable forward and rearward, and forms a coupling portion using a rotation shaft, such that an angle of the shift lever portion is varied by a manipulation of the shift lever portion, and a preset gear shift manipulation is performed depending on the angle of the shift lever which is varied by the manipulation of the shift lever portion.

Therefore, a driver in a vehicle to which the organ type electronic automatic shift lever of the present invention is applied pushes or pulls a gear shift manipulation part forward and rearward when manipulating the automatic shift lever, and an angle of the shift lever portion is varied to correspond to an angle of an arm of the driver, thereby providing an advantage in that it is convenient for the driver because of ease and operational feeling when gear shifting is performed.

Figure 1:
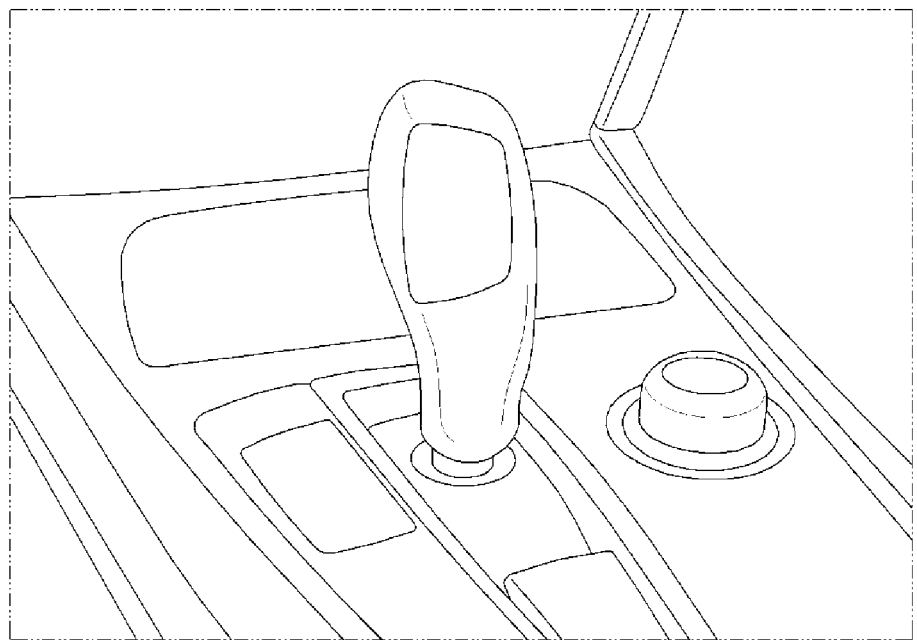
FIG. 1 illustrates an example of an electronic shift lever in the related art.
Figure 2:
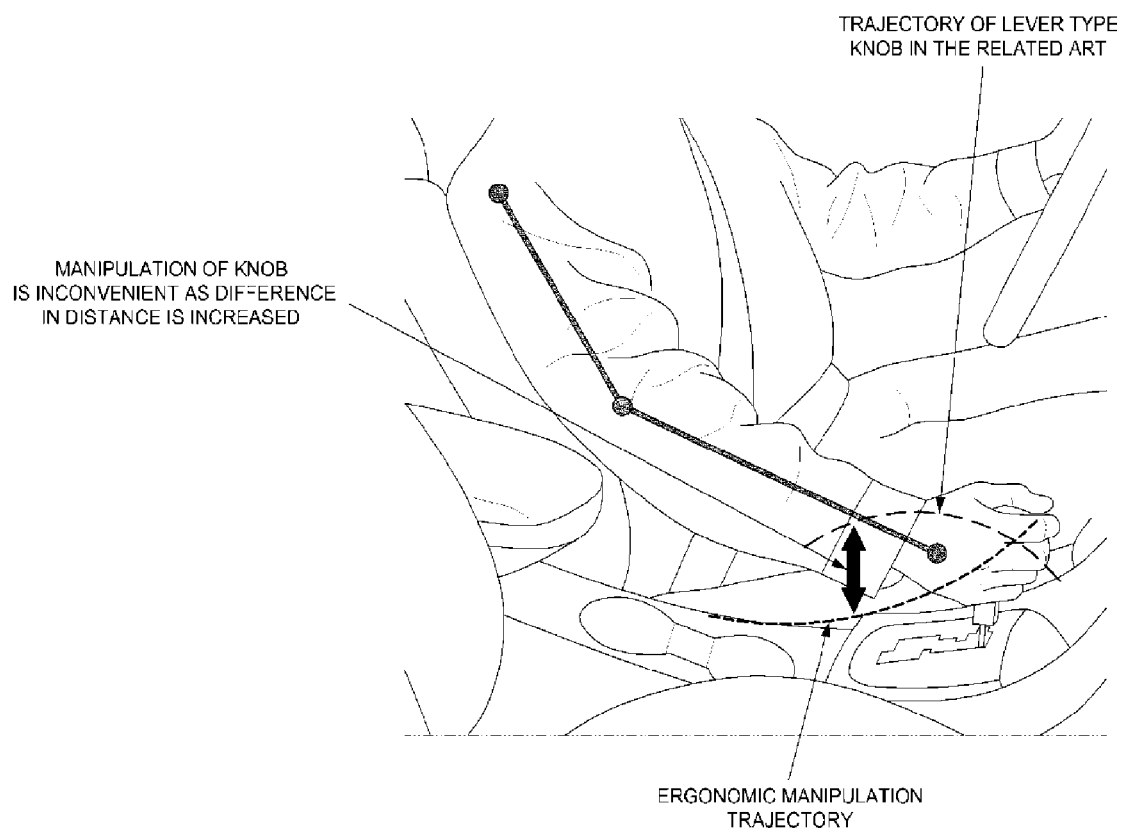
FIG. 2 illustrates an arm structure of a user who manipulates the electronic shift lever in the related art.
Figure 3:
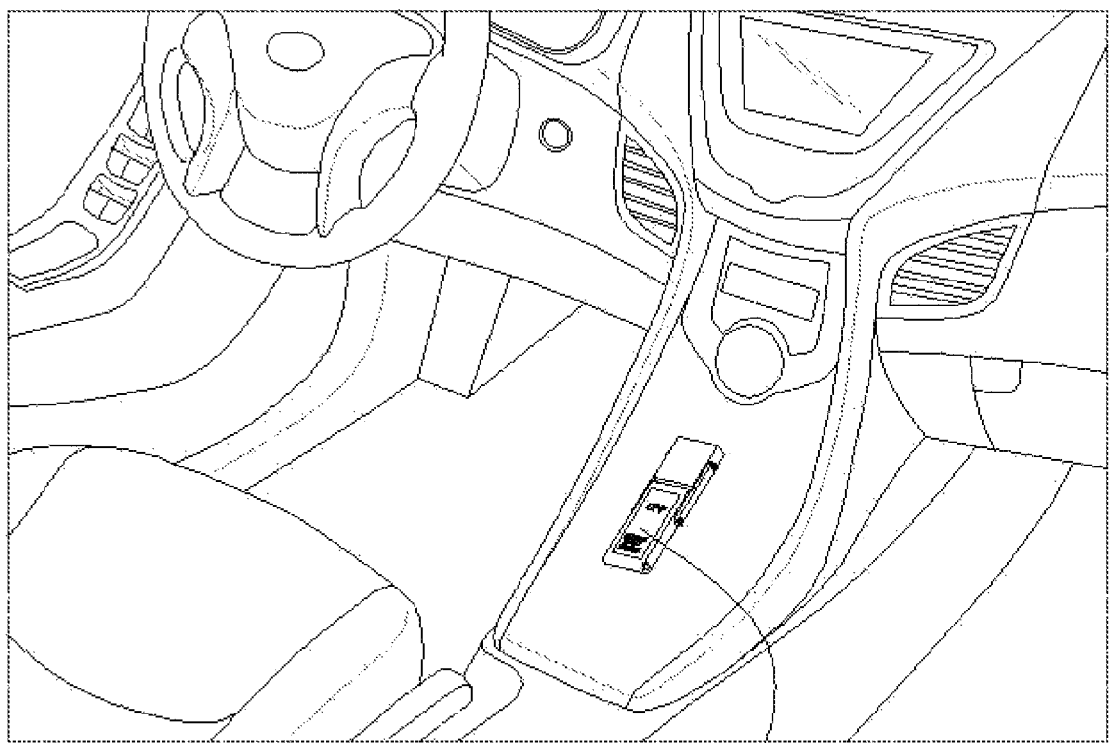
FIG. 3 illustrates a driver seat to which an exemplary organ type electronic automatic shift lever of the present invention is applied.

FIG. 3 illustrates a driver seat to which an organ type electronic automatic shift lever according to various embodiments of the present invention is applied. As illustrated, the present invention provides an organ type electronic automatic shift lever 100 for controlling an electronic automatic transmission provided in a vehicle, which differs from a shift lever in the related art that is positioned on a console in a vehicle.

The organ type electronic automatic shift lever 100 has a configuration in which a shift lever portion 10, which has a rectangular parallelepiped or substantially rectangular parallelepiped shape having a predetermined thickness and flat upper and bottom surfaces (the present invention is not limited thereto), is coupled to a console surface 200 by an operating arm 20 and a rotation shaft.

The shift lever portion 10 and the operating arm 20 are rotatably coupled by the rotation shaft so as to be rotatable axially, and the shift lever portion 10 is configured to have a lower portion that is attached on the console surface 200 such as by magnetic force. Therefore, a driver, who drives the vehicle to which the organ type electronic automatic shift lever 100 of the present invention is applied, pushes the shift lever portion 10 forward or pulls the shift lever portion 10 rearward, thereby leading a gear shift stage to be inputted. In this case, a position and an angle at which the shift lever portion 10 has been moved by a manipulation of the driver are recognized by separate constitute elements, such that corresponding gear shifting is performed.

The interior of the vehicle to which the present invention having the aforementioned configurations is applied is provided with the automatic shift lever that is disposed to be adjacent to and in parallel or substantially in parallel with the console surface 200 in the vehicle, and thus does not require a large space for accommodating a shift lever in comparison with the vehicle having an automatic shift lever in the related art, thereby providing effects capable of increasing an accommodating space in the vehicle and securing a space for a driver seat.

Figure 4:
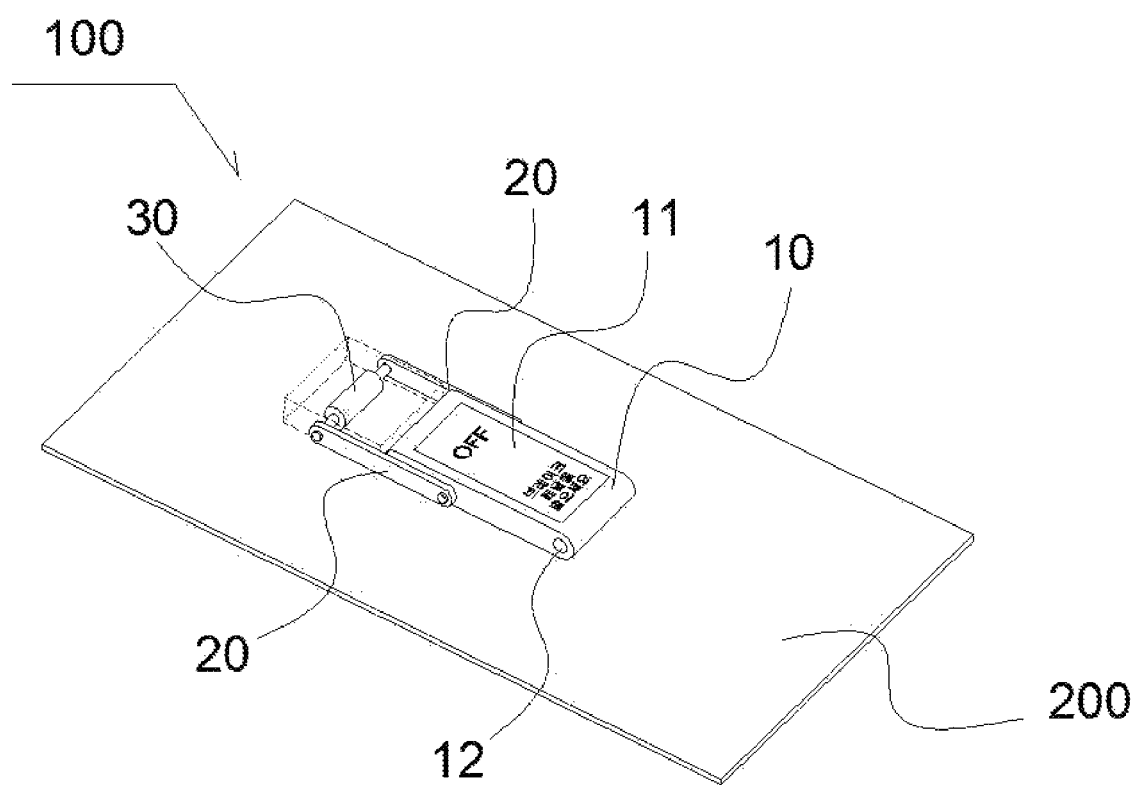
FIG. 4 is a perspective view illustrating in detail an exemplary organ type electronic automatic shift lever according to the present invention.

FIG. 4 is a perspective view illustrating in detail the organ type electronic automatic shift lever according to various embodiments of the present invention. As illustrated, the organ type electronic automatic shift lever 100 of the present invention includes the shift lever portion 10 which is disposed on the console surface 200 of the vehicle so as to be in parallel or substantially in parallel with the console surface 200, and includes a display means for displaying information, an operating arm 20 which has one end that is rotatably coupled to the shift lever portion 10 by the rotation shaft so as to fix and rotate the shift lever portion 10, a step motor unit 30 which is rotatably coupled to the other end of the operating arm 20 by the rotation shaft so as to fix the operating arm 20 on the console surface 200, and includes a step motor. In some embodiments, the organ type electronic automatic shift lever 100 further includes a position recognition unit 40 which recognizes a gear shift stage by recognizing a position at which the shift lever portion 10 has been moved, and a gear shift stage control unit which is connected to a control unit for an electronic automatic transmission of the vehicle.

The shift lever portion 10 has a predetermined shape, and may have a hexahedron shape that has a predetermined thickness and a curved surface at a lower portion thereof (the present invention is not limited thereto, and the shift lever portion 10 may be formed in various other shapes), and includes a display unit 11 that is attached to an upper surface of the shift lever portion 10. However, the shape of the shift lever portion 10 is not limited to a rectangular parallelepiped or substantially rectangular parallelepiped shape, and may be formed with a curved surface, if necessary, in order to improve convenience for manipulation of the driver, and the present invention is not limited by the shape of the shift lever portion 10. In some embodiments of the present invention, the shift lever portion 10 needs to slide along the console surface 200, and thus a curved surface is formed at a lower portion of the shift lever portion 10.

The shift lever portion 10 is a constituent element that is directly manipulated by the driver, and a position of the shift lever portion 10 is moved forward and rearward (forward and rearward directions based on the driver or on driving direction) by a manipulation of the driver. The shift lever portion 10 is configured to be automatically disposed in parallel or substantially in parallel with and come into close contact with the console surface 200 of the vehicle when the manipulation is turned off, such that the shift lever portion 10 does not occupy the internal space of the vehicle.

The display unit 11 of the shift lever portion 10 may include any publicly known display means such as, for example, an LCD or an AMOLED, and may include a touch screen means that is publicly known, if necessary. The display unit 11 is configured to be operated in conjunction with the gear shift stage control unit that controls gear shifting, and receive gear shift stage information of the vehicle from the gear shift stage control unit and display the gear shift stage information.

The shift lever portion 10 is coupled on the console surface 200 by the operating arm 20. In this case, the shift lever portion 10 is rotatably coupled to the operating arm 20 by the rotation shaft, and the operating arm 20 is configured to be rotatable by being coupled to a motor rotation shaft of the step motor unit 30 that is fixed on the console surface 200. The operating arm 20 may be coupled to an upper portion (this is not limited to an upper end) of the shift lever portion 10, and for example, the operating arm 20 may be coupled to any position that is positioned above a central portion of the shift lever portion 10.

The rotation shaft and the motor rotation shaft may be disposed in a horizontal or substantially horizontal direction of the shift lever portion 10 (in a direction from one end toward the other end of the shift lever portion 10) so that the shift lever portion 10 may be rotated forward and rearward by the rotation shaft and the motor rotation shaft.

Meanwhile, a publicly known magnet is embedded in the lower portion of the shift lever portion 10 so that the shift lever portion 10 is fixed on the console surface 200 by magnetic force. In this case, a magnetic material (for example, a metallic material such as iron that may be attached to the magnet by magnetic force), which corresponds to the magnet, may be embedded at a position in the console.

The operating arm 20 is a constituent element which has one end that is rotatably coupled to the upper portion of the shift lever portion 10 by the rotation shaft so as to fix the upper portion of the shift lever portion 10 to the console surface 200.

In the exemplary embodiment illustrated in FIG. 4, a pair of operating arms 20, which is rotatably coupled to side surfaces of the shift lever portion 10 by the rotation shaft, respectively, but the present invention is not limited thereto, and it is apparent to those skilled in the art that the operating arm 20 may be formed as a single constituent element, may be coupled at any position (for example, a bottom surface) on the upper portion of the shift lever portion 10 by the rotation shaft, or may be formed in any publicly known shape that may be rotatably coupled to the side surface or the bottom surface of the shift lever portion 10 by the rotation shaft so as to rotatably fix the shift lever portion 10.

One end of the operating arm 20 is rotatably coupled to the shift lever portion 10 by the rotation shaft, and the other end of the operating arm 20 is coupled to the step motor unit 30, thereby fixing the upper portion of the shift lever portion 10 on the console surface 200 so that the upper portion of the shift lever portion 10 is rotatable forward and rearward.

The step motor unit 30 includes a publicly known step motor that is rotated at a predetermined angle by a pulse voltage. The step motor is a publicly known means which includes a stator, and a rotor that is configured to be rotated inside the stator. The step motor unit 30 is fixed on the console surface 200 through a case that houses the step motor, and rotatably coupled to the other end of the operating arm 20 by the rotation shaft so as to fix gear shift manipulation parts to the console surface 200.

Rotation of the step motor unit 30 is controlled in conjunction with the gear shift stage control unit, and the gear shift stage control unit rotates the step motor unit 30 at the time of initially starting an engine and at the time of turning off the engine so as to control an angle of the shift lever portion 10. In other words, when the step motor unit 30 is controlled by the gear shift stage control unit, and an electric current is applied to the step motor unit 30, the step motor unit 30 is rotated by a preset rotation amount, and rotates the operating arm 20, which is connected with the motor rotation shaft of the step motor unit 30, thereby controlling the angle of the shift lever portion 10, and a detailed operation will be described below.

According to the step motor unit 30 that is configured as described above or the like, when the driver moves the shift lever portion 10 in a state in which the step motor is stopped, the motor rotation shaft of the step motor is rotated by rotation of the operating arm 20, and rotational torque of the motor rotation shaft is transmitted to the rotor connected in the step motor such that the rotor is rotated. In general, permanent magnets are disposed in the rotor, and the rotor passes over curved portions formed by cores of the stator while rotating, and at this time, a variation in torque occurs as a distance between the permanent magnets and the stator is varied. Typically, this variation is called cogging torque, and the present invention has a configuration which provides this cogging torque as feeling of moderation at the time of manipulating the shift lever portion 10.

In one exemplary embodiment of the present invention, lengths of the cores of the stator, which constitutes the step motor unit 30, may be different from each other. Therefore, when the rotor rotates inside the stator, different cogging torque may be provided as feeling of moderation due to differences in length of the stator.

The gear shift stage control unit recognizes a gear shift stage selected by manipulating the shift lever portion 10, and transmits the recognized gear shift stage information to the electronic automatic transmission while being operated in conjunction with the electronic automatic transmission of the vehicle so as to serve to perform gear shifting.

The gear shift stage control unit controls the rotation of the step motor unit 30 while being operated in conjunction with the step motor unit 30 so as to be able to control the position of the shift lever portion 10 that is connected with the step motor unit 30 by the operating arm 20.

The gear shift stage control unit is operated in conjunction with the position recognition unit 40, stores position recognition information that is formed by matching each position of the shift lever portion 10, which is recognized by the position recognition unit 40, to each gear shift stage, and recognizes a gear shift stage by matching the position of the shift lever portion 10, which is recognized by the position recognition unit 40, to position recognition information that has been preset and stored in advance, thereby recognizing a gear shift stage that is manipulated by the driver. In this case, the gear shift stage control unit may include gear shift stage information including information about a P-stage, an R-stage, an N-stage, a D-stage, and an M-stage that are gear shift stages of the vehicle, and preset position recognition information by matching the gear shift stage information to each position of the shift lever portion 10, which is recognized by the position recognition unit 40, and match the position of the shift lever portion 10 to the position recognition information.

The gear shift stage control unit is operated in conjunction with the shift lever portion 10 so as to provide the gear shift stage information to the display means provided on the shift lever portion 10 so that the gear shift stage information is displayed. In other words, when any gear shift stage is selected as the position of the shift lever portion 10 is recognized as described above, the gear shift stage control unit transmits the selected gear shift stage information to the display unit 11 included in the shift lever portion 10, thereby providing the currently selected gear shift stage information to the driver.

Meanwhile, the gear shift stage control unit may be mounted inside the console of the vehicle where the organ type electronic automatic shift lever 100 is disposed, but the present invention is not limited thereto. In addition, the gear shift stage control unit may include a publicly known electronic control unit (ECU), and other various publicly known means, which is provided to process information and control constituent elements, may be applied. Because this configuration is publicly known, a detailed description thereof will be omitted.

The gear shift stage control unit produces gear shift information allocated to the currently selected gear shift stage information by matching preset position recognition information to the position of the shift lever portion 10 which is inputted from the position recognition unit 40 using the aforementioned configuration, and transmits the gear shift information to the control unit of the electronic automatic transmission of the vehicle, thereby performing gear shifting to the gear shift stage selected by the driver.

The position recognition unit 40 is a constituent element that is mounted inside the console of the vehicle so as to recognize a position of a magnetic unit 12 that is mounted on the lower portion of the shift lever portion 10. The position recognition unit 40 has one or more publicly known magnetic sensors, detects the position of the magnetic unit 12, and transmits position information of the shift lever portion 10 to the gear shift stage control unit.

The position recognition unit 40 may have a plurality of magnetic sensors that corresponds to the number of gear shift stages of the vehicle, and the magnetic sensors are arranged along a movement route of the lower portion of the shift lever portion 10. However, the magnetic sensors, which are provided in the position recognition unit 40, are not limited thereto, and the magnetic sensors may have other various configurations capable of detecting the position of the magnetic unit 12 within a movement route of the magnetic unit 12 mounted on the lower portion of the shift lever portion 10.

Figure 5:
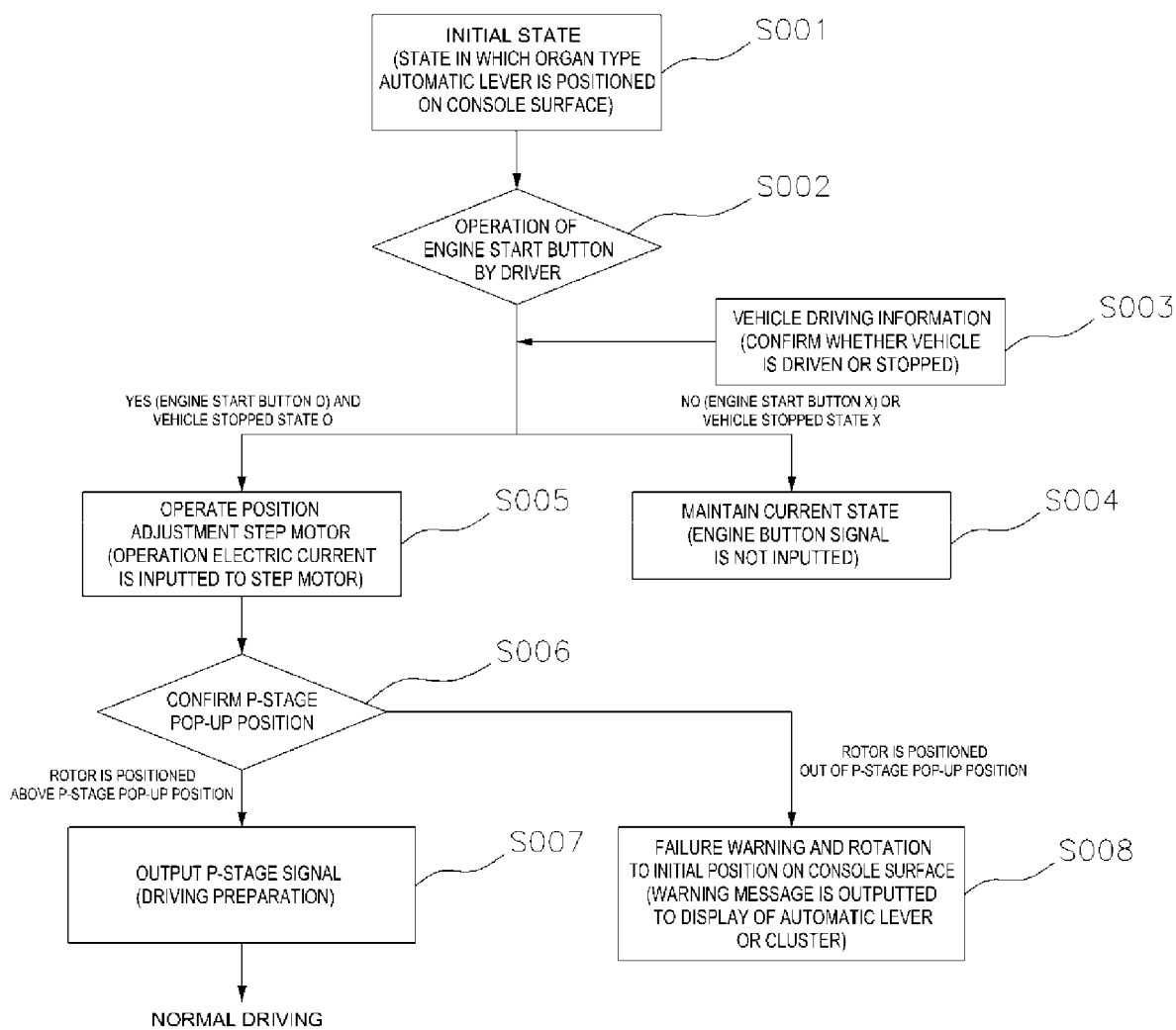
FIG. 5 is a flow chart illustrating an initial pop-up process of a shift lever portion in an exemplary organ type electronic automatic shift lever according to the present invention.
Figures 6A, 6D:
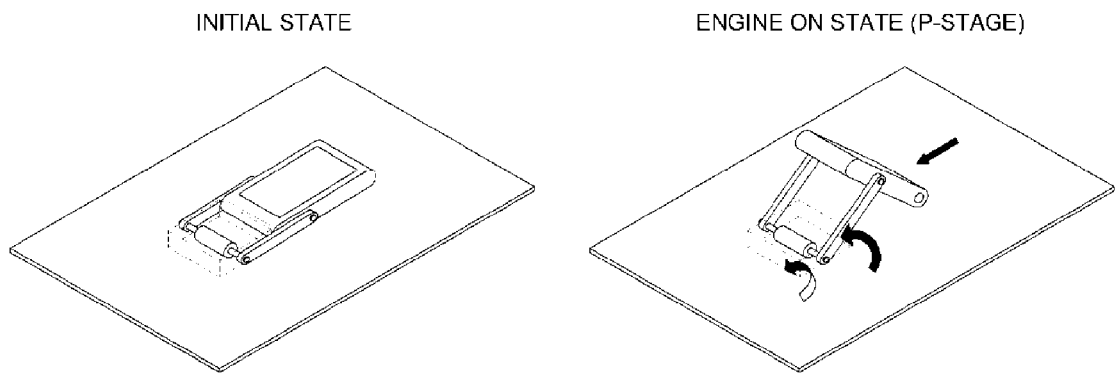
FIG. 6A, FIG. 6B, FIG. 6C, FIG. 6D, FIG. 6E and FIG. 6F illustrate a state for each situation of a shift lever portion that is popped up by the step motor unit.
Figures 6B, 6E:
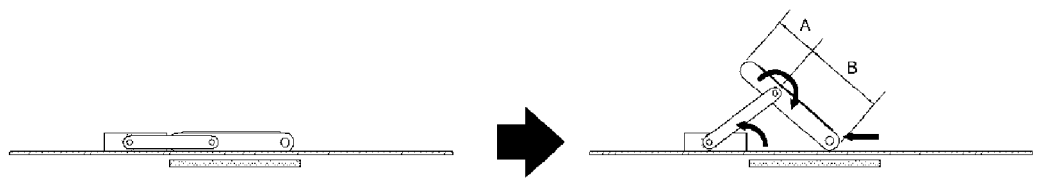
Figures 6C, 6F:
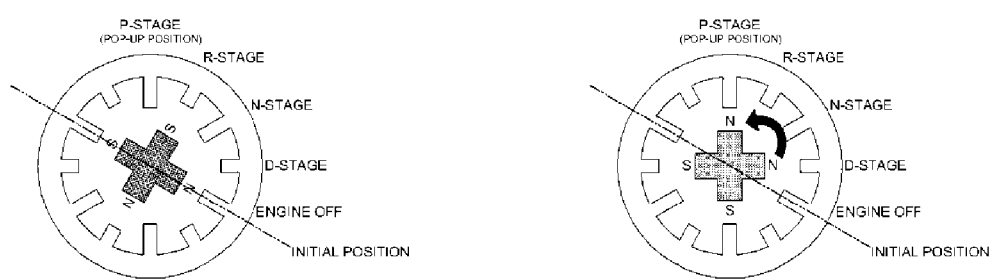

FIG. 5 is a flow chart illustrating one exemplary embodiment of an initial pop-up process of the shift lever portion 10 of the organ type electronic automatic shift lever 100 of the present invention, which is configured as described above or the like, and FIG. 6 (including FIGS. 6A-6F) illustrates a state for each situation of the shift lever portion 10 that is popped up by the step motor unit 30.

In various embodiments of the present invention, the shift lever portion 10 is configured to be popped up when the engine of the vehicle is started (engine ON) by the driver, such that the driver easily manipulates the shift lever portion 10.

To this end, the gear shift stage control unit recognizes an engine ON state while being operated in conjunction with the control unit of the vehicle, and controls the step motor unit 30 at the time of starting the engine so as to allow the gear shift stage control unit to be popped up. This process will be described below.

First, in an initial gear shift standby state (in a state in which the engine is turned off, (hereinafter, referred to as 'an engine off state')), the shift lever portion 10 is controlled so as to be popped down and disposed in parallel or substantially in parallel with the console surface 200 (S001). In this step, since the shift lever portion 10 is disposed and positioned in parallel or substantially in parallel with the console surface 200, the shift lever is present in a state in which the shift lever does not occupy the internal space of the vehicle. Therefore, the magnetic unit 12, which is mounted at a lower end portion of the shift lever portion 10, is positioned at an engine off recognition position, and as a result, an engine off state is recognized by the position recognition unit 40.

The gear shift stage control unit continuously determines whether or not the engine of the vehicle is turned on while being operated in conjunction with the control unit of the vehicle such as, for example, a vehicle body control module (BCM) (S002). At the same time, the gear shift stage control unit receives vehicle driving information from the control unit of the vehicle and determines whether the vehicle is currently driven, or in a stopped state (S003).

In various embodiments of the present invention, an input manipulation of the organ type electronic automatic shift lever 100 is performed to allow the shift lever portion 10 to be popped up for the purpose of an initial input manipulation in a case in which the engine is turned on, and at the same time, the vehicle is stopped. Therefore, as described above, the gear shift stage control unit monitors vehicle engine starting input from the control unit of the vehicle and vehicle driving information, and continuously recognizes a state in which the engine of the vehicle is started, and the vehicle is in a driving state.

In step S002 and step S003, if it is determined that the engine of the vehicle is not currently turned on or the vehicle is not in a stopped state, the gear shift stage control unit controls the step motor unit 30 so that the current state of the step motor unit 30 is maintained (S004). In this step, in a case in which the engine of the vehicle is in an off state, the state of the shift lever portion 10 (that is, in a state in which the shift lever portion 10 is popped down and positioned on the console surface 200) is maintained so as not to allow the shift lever portion 10 to be popped up. In addition, when it is determined that the vehicle is not in a stopped state but is in a driving state, the shift lever portion 10 is controlled so that the current state of the shift lever portion 10 is maintained.

On the contrary, in step S002 and step S003, if it is determined that the engine of the vehicle is currently turned on or the vehicle is in a stopped state, the gear shift stage control unit determines this state as an initial input standby step of the vehicle, operates the step motor, and controls the shift lever portion 10 so that the shift lever portion 10 is moved to a position allocated to the preset P-stage (S005). That is, when the driver starts the engine of the vehicle, the gear shift stage control unit controls the step motor unit 30 so that the rotor positioned inside the step motor unit 30 is rotated, and the operating arm 20 connected to the rotor is rotated. Therefore, an upper end portion of the shift lever portion 10, which is rotatably coupled to one end of the operating arm 20, is popped up by rotation of the operating arm 20 in a direction in which the operating arm 20 is rotated. In this case, the magnetic unit 12, which is mounted at the lower end portion of the shift lever portion 10, is fixed by magnetism of the magnetic material mounted in the console of the vehicle so as to be laterally movable.

Thereafter, the gear shift stage control unit receives information about the position of the shift lever portion 10 through the position recognition unit 40, and determines that the shift lever portion 10 is positioned at the P-stage (S006).

In step S006, when the shift lever portion 10 is positioned at the P-stage, the gear shift stage control unit normally receives a gear shift manipulation, and controls gear shifting to the corresponding gear shift stage (S007).

However, in step S007, when it is determined that the shift lever portion 10 is not positioned at the P-stage, the gear shift stage control unit controls the step motor unit 30 so that the shift lever portion 10 is positioned at an initial position, that is, in a state in which the shift lever portion 10 is positioned on the console surface 200 (a state in step S001), produces and outputs a warning message, and sends the warning message to the display unit 11 included in the shift lever portion 10 so that the warning message is outputted (S008).

Figure 9A:
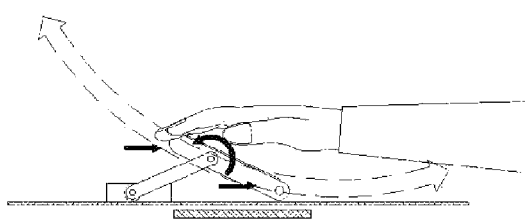
FIG. 9A and FIG. 9B illustrate a trajectory of a shift lever portion when manipulating the shift lever portion as illustrated in FIGS. 7A-7F and 8A-8F.
Figure 9B:
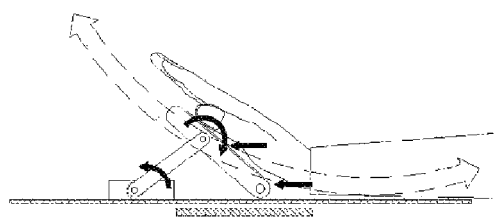

FIG. 7 (including FIGS. 7A-7F) illustrates a process of manipulating the shift lever portion 10, which is in a pop-up state, of the organ type electronic automatic shift lever of the present invention, which is configured as described above or the like, to any stage (e.g., N-stage), FIG. 8 (including FIGS. 8A-8F) illustrates a process of manipulating the shift lever portion 10, which is positioned at any gear shift stage position (e.g., N-stage), of the organ type electronic automatic shift lever 100 of the present invention to the P-stage, and FIG. 9 (including FIGS. 9A and 9B) illustrates a trajectory of the shift lever portion 10 when manipulating the shift lever portion 10 as illustrated in FIGS. 7 and 8.

As described above, the shift lever portion 10, which has been popped up at the time of initially turning on the engine, is controlled so as to be positioned at the P-stage position. In various embodiments of the present invention, when positioning the shift lever portion to the P-stage, the position of the shift lever portion 10, that is, the position of the magnetic unit 12 of the shift lever portion 10 is closest to the step motor unit 30, and when the engine is turned off, the position of the magnetic unit 12 of the shift lever portion 10 is positioned at a position farthest from the step motor unit 30.

Gear shifting is performed when the driver pushes or pulls the shift lever portion 10, which has been popped up at the time of initially turning on the engine, by hand, and in the illustrated example, the manipulation from the P-stage to the N-stage is performed by pulling the shift lever portion 10.

In various embodiments of the present invention, gear shift stage positions allocated to the position recognition unit 40 are disposed in the order of the P-stage=>the R-stage=>the N-stage=>the D-stage=>the engine off-stage, and the manipulation from the P-stage to the N-stage is performed by pulling the shift lever portion 10 rearward, as illustrated in FIG. 8 (including FIGS. 8A-8F).

In this case, when the driver pulls the shift lever portion 10 rearward for the purpose of the manipulation from the P-stage to the N-stage, the rotor of the step motor unit 30 overcomes cogging torque of the stator, and is rotated to the N-stage via the R-stage while providing feeling of moderation. In this case, the position recognition unit 40 senses magnetism of the magnetic unit 12 of the shift lever portion 10 that is positioned at an N-stage recognition position, and outputs the N-stage.

On the contrary, the manipulation from the N-stage to the P-stage is performed by pushing the shift lever portion 10 forward, as illustrated in FIG. 8.

In this case, when the driver pushes the shift lever portion 10 forward for the purpose of the manipulation from the N-stage to the P-stage, the rotor of the step motor unit 30 overcomes cogging torque of the stator, and is rotated to the P-stage via the R-stage while providing feeling of moderation. In this case, the position recognition unit 40 senses magnetism of the magnetic unit 12 of the shift lever portion 10 that is positioned at a P-stage recognition position, and outputs the P-stage.

During the aforementioned gear shift manipulation process, an arm of the driver is moved along a curved trajectory, as illustrated in FIG. 9 (including FIGS. 9A and 9B), the arm is raised as the arm becomes close to the P-stage, and the arm is lowered as the arm becomes close to the engine off-stage, such that the curved trajectory nearly matches an ergonomic manipulation trajectory, thereby providing an advantage capable of greatly improving operational feeling.

Figure 10:
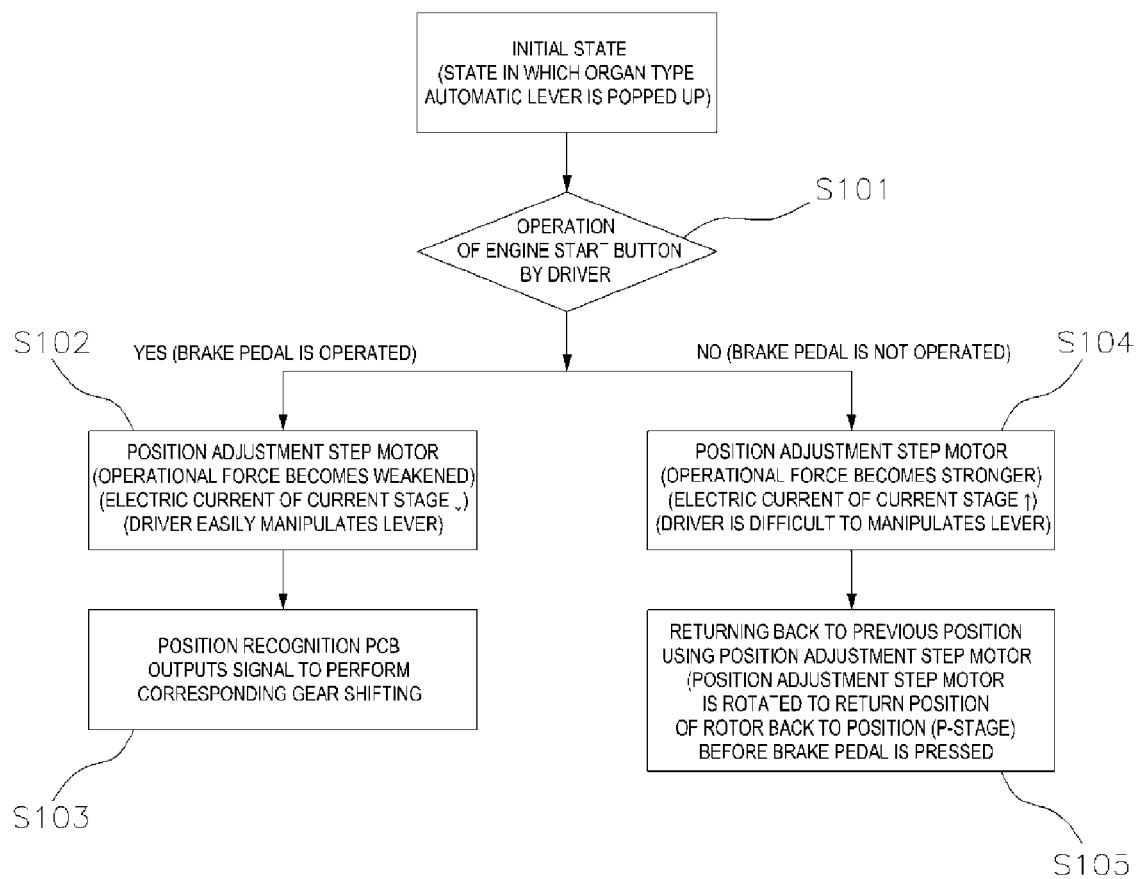
FIG. 10 is a flow chart illustrating an exemplary shift lock control process according to the present invention.

FIG. 10 is a flow chart illustrating a shift lock control process according to various embodiments of the present invention.

Since the organ type electronic automatic shift lever 100 of the present invention is an automatic shift lever, it is possible to control the gear shift stage using only the shift lever unlike a mechanical shift lever in the related art.

However, in an initial state (in a state in which the shift lever portion is positioned at the P-stage) when the control unit waits the gear shift manipulation of the driver, when the gear shift manipulation is performed in a state in which brake pedal input is not performed, an accident may occur and internal structures of the vehicle may be damaged.

Therefore, in various embodiments of the present invention, in order to lead the brake pedal input to be performed in the initial state, the organ type electronic automatic shift lever 100 allows the gear shift stage control unit to receive the brake pedal input, enables a normal manipulation in a case in which the brake pedal input is performed, and controls the step motor so that it is inconvenient for the driver when manipulating the shift lever portion in a case in which the brake pedal input is not performed.

As illustrated, in the initial state, the gear shift stage control unit receives the brake pedal input from the control unit of the vehicle, and determines whether or not the brake pedal input is performed (S101).

In step S101, when it is determined that the brake pedal input is performed, the gear shift stage control unit reduces an electric current being applied to a stator coil of the step motor unit 30 so as to control the step motor so that operational force of the step motor is decreased (S102). When the electric current flowing in the stator coil is reduced, the rotor is easily rotated because force for gripping the rotor becomes weakened. Therefore, when external force is applied to the step motor in a state in which the step motor is stopped, the step motor may be easily rotated by the applied external force.

Thereafter, when the position recognition unit 40 recognizes movement of the position of the shift lever portion 10 as the shift lever portion 10 is manipulated, the gear shift stage control unit normally controls the aforementioned gear shifting (S103).

In step S101, if it is determined that the brake pedal input is not performed, the gear shift stage control unit increases the electric current being applied to the stator coil of the step motor unit 30 so as to control the step motor so that operational force of the step motor is strengthened (S104). When the electric current flowing in the stator coil is increased, it is difficult to rotate the rotor because force for gripping the rotor becomes stronger, and as a result, it is difficult for the driver to manipulate the shift lever. Therefore, when external force is applied to the step motor in a state in which the step motor is stopped, the step motor may not be easily rotated by the applied external force.

Thereafter, when the position recognition unit 40 recognizes movement of the position of the shift lever portion 10 as the shift lever portion 10 is manipulated, because this means that the position of the shift lever portion 10 is moved by a forced manipulation of the driver, the gear shift stage control unit recognizes the movement of the shift lever portion 10 that has been abnormally moved, and controls the step motor so that the shift lever portion 10 returns back to the initial position (S105). In this case, the gear shift stage control unit may preset and store in advance the initial position of the shift lever portion 10.

Figure 11:
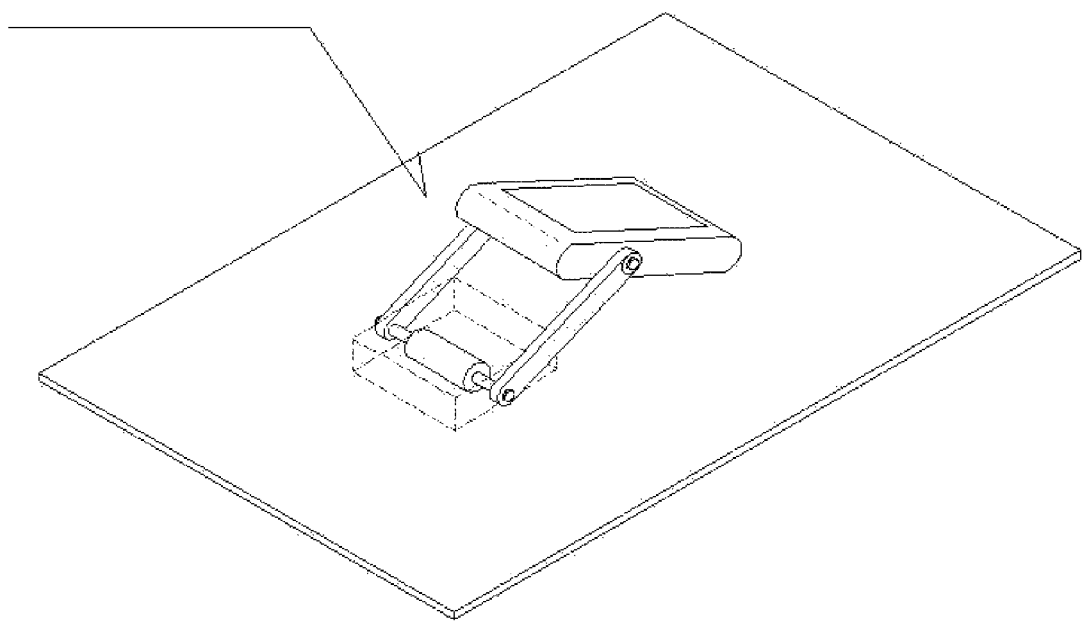
FIG. 11 illustrates a variation in position of a shift lever portion in accordance with a gear shift process according to the present invention.

FIG. 11 illustrates a variation in position of the shift lever portion 10 in accordance with the gear shift process according to various embodiments of the present invention. As described above, the shift lever portion 10 is popped up by the step motor unit 30 at the time of initially turning on the engine, and is controlled so as to be in the P-stage input state.

In various embodiments of the present invention, the driver pushes or pulls the shift lever portion 10 that has been popped up as described above, thereby performing gear shift input.

When the shift lever portion 10 is initially popped up, the magnetic unit 12, which is mounted at the lower end portion of the shift lever portion 10, is moved to the P-stage recognition position by the pop-up operation of the shift lever portion 10. Thereafter, when the shift lever portion 10 is pulled by the driver and moved, the magnetic unit 12 is horizontally moved in the order of the R-stage, the N-stage, and the D-stage. To this end, the position recognition unit 40 sequentially sets the P-stage, the R-stage, the N-stage, the D-stage, and the engine off-stage between the initial P-stage position and the engine off position, such that the position recognition unit 40 recognizes the gear shift manipulation when the magnetic unit 12 is positioned at the corresponding position.

In this case, the step motor unit 30 may allow intervals between the cores of the stator to correspond to intervals between the P-stage, the R-stage, the N-stage, the D-stage, and the engine off-stage, such that the manipulation of the shift lever portion 10 may be accurately performed by feeling of finalization provided by cogging torque of the stator coil and the rotor.

Figure 12:
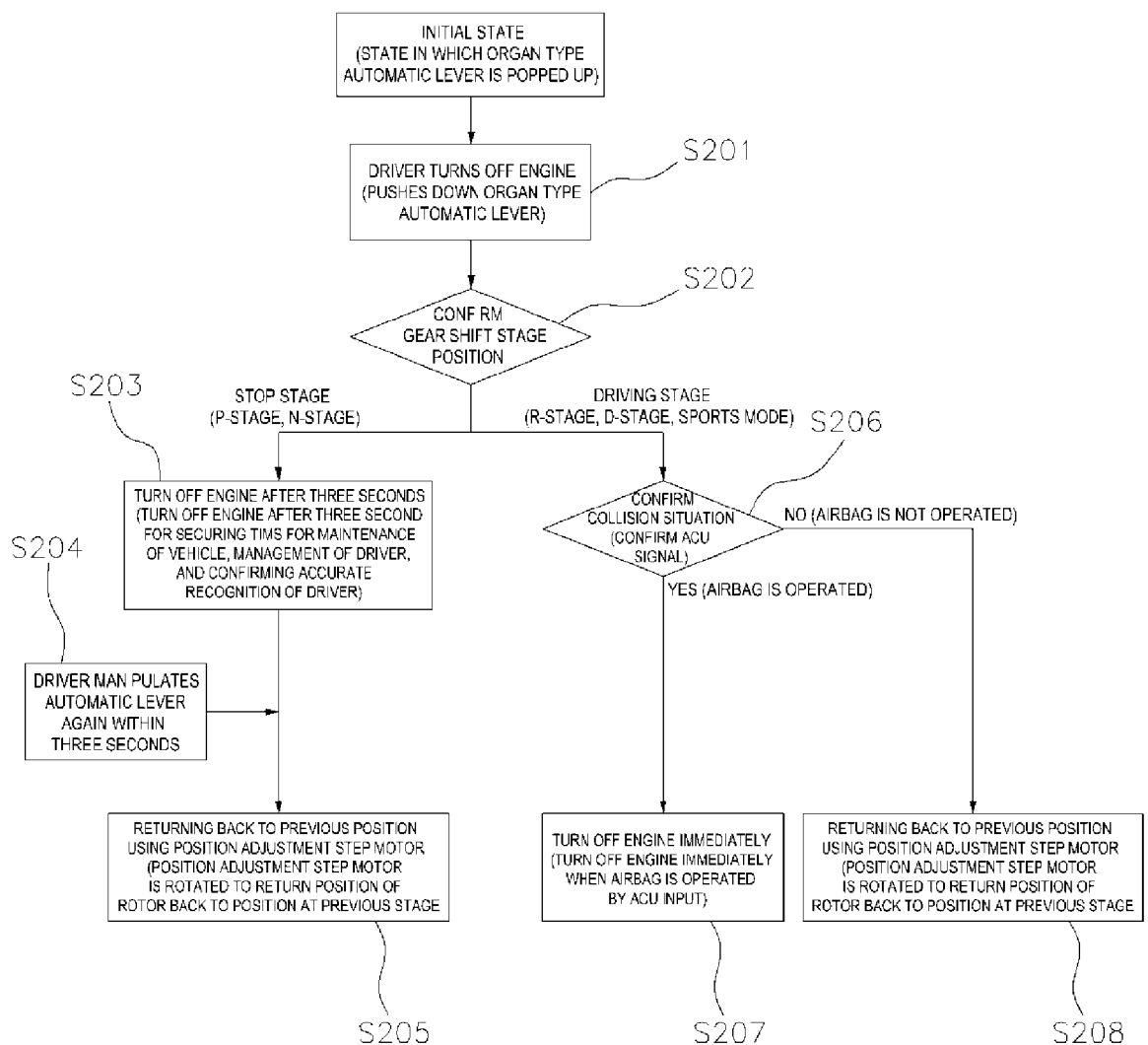
FIG. 12 is a flow chart illustrating an exemplary engine off control method using an exemplary organ type electronic automatic shift lever according to the present invention.
Figure 13A:
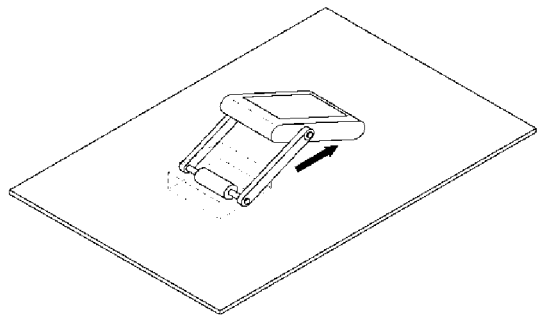
Figure 13D:
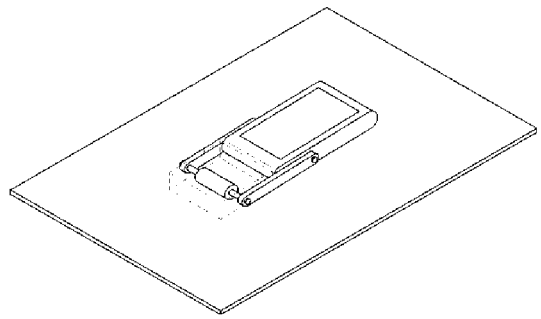
Figure 13C:
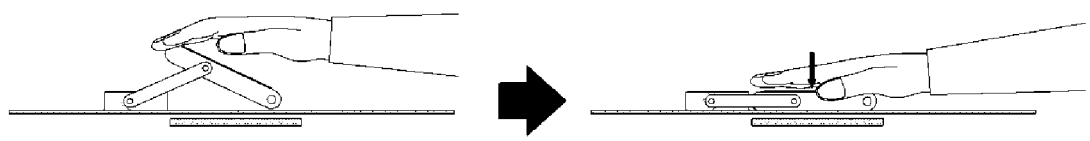
Figure 13C:
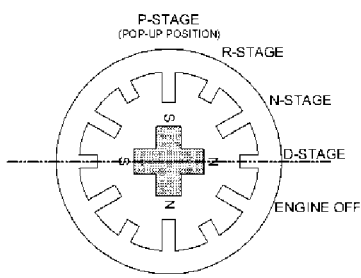
Figure 13F:
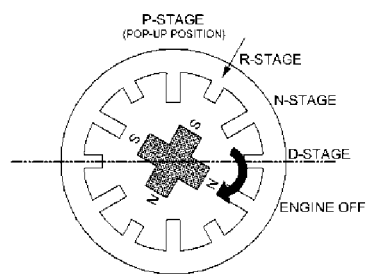

FIG. 12 is a flow chart illustrating an engine off control method using the organ type electronic automatic shift lever according to various embodiments of the present invention, and FIG. 13 (including FIGS. 13A-13F) illustrates an engine off control manipulation state using the organ type electronic automatic shift lever according to various embodiments of the present invention.

The organ type electronic automatic shift lever 100 of various embodiments of the present invention includes the engine off-stage so as to turn off the engine of the vehicle by positioning the shift lever portion 10 at the engine off-stage. More particularly, the organ type electronic automatic shift lever 100 of the present invention is configured so that when the shift lever portion 10 is popped down by being pulled rearward at the time of turning off the engine, that is, when the shift lever portion 10 is positioned at the engine off-stage, the engine is turned off after a predetermined time has passed.

The present invention, which is configured to perform the engine off manipulation by the aforementioned manipulation of the shift lever, improves a gear shift manipulation structure in the related art which provides inconvenience in that the driver needs to manipulate the shift lever to the P-stage and then turn off the engine even when the driver feels fatigued after driving the vehicle for a long time, and improves convenience for the driver by allowing the driver to turn off the engine of the vehicle by merely touching the upper portion of the shift lever portion 10 with the hand and slightly pressing the shift lever portion 10 from top to bottom after the driver reaches a destination.

In this case, at the time of the aforementioned engine off-stage manipulation, the previous stage needs to be a stop stage such as the P-stage or the N-stage so as to be able to turn off the engine. In addition, in consideration of an incorrect manipulation of the driver, the engine is turned off after a predetermined standby time, for example, about three seconds.

The aforementioned engine off structure is performed by the following steps.

First, in an initial state (here, the initial state means a state in which the shift lever portion 10 is positioned at any gear shift stage), when the driver manipulates the shift lever portion 10 to the engine off-stage (S201), the gear shift stage control unit confirms a position of the gear shift stage at which the shift lever portion 10 was positioned immediately before the gear shifting to the engine off-stage is performed (hereinafter, referred to as 'previous stage') (S202).

As described above, the engine off-stage is a gear shift stage allocated to the position where the shift lever portion 10 is disposed to be adjacent to and in parallel or substantially in parallel with the console surface 200 in the vehicle, and for the purpose of the gear shifting to the engine off-stage, the driver may turn off the engine by pressing the shift lever portion 10 downward. However, in a case in which the manipulation of the shift lever portion 10 is not intended by the driver, that is, for example, in a case in which the shift lever portion 10 is moved due to a vehicle collision or an incorrect manipulation of the driver, because these cases cause a secondary accident, the gear shift stage control unit of the present invention confirms the position of the previous stage, and performs the following two confirmation steps.

First, in step S202, in a case in which the position of the previous stage is the stop stage, for example, the P-stage or the N-stage, the gear shift stage control unit turns off the engine after waiting for a predetermined standby time (S203). In various embodiments of the present invention, the predetermined standby time may be three seconds or more.

The standby time is provided to recognize an incorrect manipulation of the driver, or is provided for the driver to manage the vehicle. In a case in which an incorrect manipulation of the driver is recognized or it is necessary to restart the engine within the standby time, the engine of the vehicle is not turned off and maintained to be operated, by manipulating the gear shift stage control unit again.

Therefore, the manipulation of the shift lever portion 10 is performed by the driver within the standby time (S204), the gear shift stage control unit controls the step motor unit 30, that is, the gear shift stage control unit rotates the motor of the step motor unit 30 so as to return the position of the rotor back to the position at the previous stage, so that the gear shift stage is set to the previous stage.

On the contrary, in step S202, in a case in which the position of the previous stage is a driving stage, for example, the R-stage, the D-stage, or other set special stages (for example, sports mode), the gear shift stage control unit receives vehicle information while being operated in conjunction with an ACU of the vehicle so as to determine whether the current state is a vehicle collision state (S206).

In this case, the gear shift stage control unit may determine whether a vehicle collision occurs by confirming whether an airbag is operated from the ACU. In step S206, in a case in which it is determined that the airbag has been operated, because this state may be regarded as a state in which a vehicle collision occurs, the gear shift stage control unit controls the engine of the vehicle so that the engine is immediately turned off (S207).

However, in step S206, in a case in which it is determined that the airbag is not operated, the gear shift stage control unit determines that the gear shifting to the engine off-stage is performed by an incorrect manipulation of the shift lever portion 10, and controls the step motor unit 30, that is, rotates the motor of the step motor unit 30 so as to return the position of the rotor back to the position of the previous stage, so that the gear shift stage is set to the previous stage (S208).

For convenience in explanation and accurate definition in the appended claims, the terms "upper" or "lower", "forward" or "rearward", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents. invention.

What is claimed is:

1. An organ type electronic automatic shift lever comprising:
   a shift lever portion which has a lower end at which a magnetic unit including a magnet is mounted;
   a step motor unit which is fixed on a console surface of a vehicle, and includes a step motor;
   an operating arm which has one end that is rotatably connected to an upper end of the shift lever portion by a rotation shaft, and the other end that is connected to a motor rotation shaft of the step motor, and rotatably fixes the shift lever portion on the console surface;
   a position recognition unit which includes one or more magnetic sensors so as to recognize a position of the magnetic unit, and output information about the recognized position; and
   a gear shift stage control unit which controls rotation of the step motor unit, presets position recognition information produced by matching in advance gear shift stage information of the electronic automatic shift lever to each position of the position recognition unit, compares position information, which is recognized and received from the position recognition unit, with the position recognition information, and outputs gear shift information,
   wherein the gear shift stage control unit receives whether the vehicle is in a stopped state and whether an engine is started while being operated in conjunction with a control unit of the vehicle, and rotates the step motor unit so as to control the shift lever portion so that the shift lever portion is popped up when the engine is turned on in a state in which the vehicle is in the stopped state.

2. The organ type electronic automatic shift lever of claim 1, wherein the gear shift stage control unit operates the step motor unit so as to pop down the shift lever portion when the engine of the vehicle is turned off.

3. The organ type electronic automatic shift lever of claim 1, wherein the gear shift stage information includes information about a P-stage, an N-stage, a D-stage, and an engine off-stage, and the gear shift stage control unit presets the position recognition information in the position recognition unit by sequentially matching the P-stage, the N-stage, the D-stage, and the engine off-stage from a position which is the closest to the step motor to a position which is the farthest from the step motor.

4. The organ type electronic automatic shift lever of claim 3, wherein when the engine off-stage is recognized, the gear shift stage control unit turns off the engine of the vehicle while being operated in conjunction with the control unit of the vehicle, and turns off the engine after waiting for a predetermined standby time.

5. The organ type electronic automatic shift lever of claim 3, wherein intervals between cores of a stator coil of the step motor of the step motor unit are equal to intervals between gear shift stages allocated to the gear shift stage control unit in relation to the position recognition unit.

6. The organ type electronic automatic shift lever of claim 1, wherein the gear shift stage control unit receives brake pedal input from the control unit of the vehicle, and increases an electric current being applied to the step motor unit when the brake pedal input is not present at the time of an initial operation.

7. The organ type electronic automatic shift lever of claim 1, wherein the gear shift stage control unit receives brake pedal input from the control unit of the vehicle, and decreases an electric current being applied to the step motor unit when the brake pedal input is present at the time of an initial operation.

8. The organ type electronic automatic shift lever of claim 1, wherein the gear shift stage control unit controls the step motor unit so that the shift lever portion returns back to an initial position when the shift lever portion is moved in a state in which brake pedal input is not present at the time of an initial operation.

9. The organ type electronic automatic shift lever of claim 1, wherein the shift lever portion further includes a display unit, and the display unit receives the gear shift information from the gear shift stage control unit and displays the gear shift information.

10. The organ type electronic automatic shift lever of claim 1, further comprising:
a magnetic material which is mounted in the console surface of the vehicle within a movement range of the magnetic unit,
wherein a lower portion of the shift lever portion comes into close contact with the console surface by magnetic force.

11. The organ type electronic automatic shift lever of claim 1, wherein cores of a stator coil of the step motor of the step motor unit are formed to have different lengths.

* * * * *